(12) United States Patent
Stocksmeier

(10) Patent No.: US 6,474,667 B1
(45) Date of Patent: Nov. 5, 2002

(54) TWO-WHEELER IN THE FORM OF A DANDY HORSE

(76) Inventor: Eckart Stocksmeier, Engelbert-Kampfer-Strasse 58, D-32657, Lemgo (DE)

( * ) Notice: Subject to any disclaimer, the term of this patent is extended or adjusted under 35 U.S.C. 154(b) by 0 days.

(21) Appl. No.: 09/485,929

(22) PCT Filed: Jun. 17, 1999

(86) PCT No.: PCT/EP99/04202
§ 371 (c)(1),
(2), (4) Date: May 8, 2000

(87) PCT Pub. No.: WO99/67123
PCT Pub. Date: Dec. 29, 1999

(30) Foreign Application Priority Data

Jun. 19, 1998 (DE) .................................. 298 10 961 U

(51) Int. Cl.⁷ ............................ B62M 1/00; B62K 3/14; B62K 15/00
(52) U.S. Cl. .................... 280/87.05; 280/200; 280/278; 280/287
(58) Field of Search ............... 280/200, 281.1, 280/278, 287, 87.05, 87.021

(56) References Cited

U.S. PATENT DOCUMENTS

| | | | | |
|---|---|---|---|---|
| 2,372,024 A | * | 3/1945 | Schwinn | 280/287 |
| 2,447,956 A | * | 8/1948 | Morders | 280/287 |
| 4,440,414 A | * | 4/1984 | Wang | 280/287 |
| 4,842,292 A | * | 6/1989 | Wang | 280/287 |
| 4,925,203 A | * | 5/1990 | Buckler | 280/278 |
| 5,072,961 A | * | 12/1991 | Huppe | 280/278 |
| 5,149,119 A | * | 9/1992 | Hwang | 280/287 |
| 5,269,550 A | * | 12/1993 | Hon et al. | 280/287 |
| 5,398,955 A | * | 3/1995 | Yeh | 280/287 |
| 5,590,895 A | * | 1/1997 | Hiramoto | 280/287 |
| 5,836,602 A | * | 11/1998 | Wang | 280/287 |
| 6,116,629 A | * | 9/2000 | Koppensteiner | 280/287 |

FOREIGN PATENT DOCUMENTS

| | | |
|---|---|---|
| DE | 75 30321 | 3/1976 |
| DE | 295 09 586 | 10/1995 |
| FR | 762 506 | 1/1994 |

* cited by examiner

Primary Examiner—Brian L. Johnson
Assistant Examiner—Jeffrey Restifo
(74) Attorney, Agent, or Firm—Browdy and Neimark, P.L.L.C.

(57) ABSTRACT

The two-wheeler in the form of a dandy horse is propelled by the user by pushing (walking) with his or her feet on the pavement. The dandy horse having a frame (1), a front and a back wheel (3, 4) rotationally mounted therein, a saddle (5) supported by the frame (1) and handlebars (6) supported on the frame (1) for the front wheel (3). The frame (1) consists of an upper longitudinal tube (7), and steering tube (9) with a front wheel fork (10), a saddle support tube (11) and a back wheel fork (12, 13) made of metal and/or plastic and/or a composite material

13 Claims, 3 Drawing Sheets

TWO-WHEELER IN THE FORM OF A DANDY HORSE

CROSS-REFERENCE TO RELATED APPLICATION

The present application is the national stage under 35 U.S.C. 371 of PCT/EP99/04202, filed Jun. 17, 1999.

BACKGROUND OF THE INVENTION

TECHNICAL FIELD OF THE INVENTION

The invention relates to a two-wheeler in the form of a coasting dandy horse, which the rider powers by pushing (walking) his feet on the pavement.

OBJECT AND SUMMARY OF THE INVENTION

It is the object of the invention to provide a simple, inexpensive, stable yet lightweight version of the dandy horse, a two-wheeler that has been known for decades, as an optimum piece of outdoor fitness equipment.

The frame of the dandy horse according to the invention has an advantageous construction, comprises advantageous materials, and can be produced simply and inexpensively, yet is stable and lightweight. The frame lends the entire dandy horse the quality of optimum fitness equipment for outdoor use.

To promote fitness, this dandy horse has no mechanical drive, such as a chain drive with pedals, and is set in motion by the rider himself, thereby serving as an optimum multi-function exercise vehicle for physical training. The dandy horse frame can be embodied in a wide range of variations.

For transport and storage purposes, the dandy horse can also be collapsible, or can be disassembled (detachable wheel), so it can be transported (for example, on trips) in a container. The dandy horse's frame construction and equipment with accessories make it compliant with the Road Traffic Act, and allow it to be used safely in traffic.

The dandy horse represents a good outdoor fitness device, and improves the rider's sense of well-being. The feeling of self-worth and personal safety creates a positive experience for the rider.

BRIEF DESCRIPTION OF THE DRAWING

The drawings illustrate variations of an embodiment that is explained in detail below. Shown are in.

DETAILED DESCRIPTION OF THE PREFERRED EMBODIMENT(S) OF THE INVENTION

Figure 1:
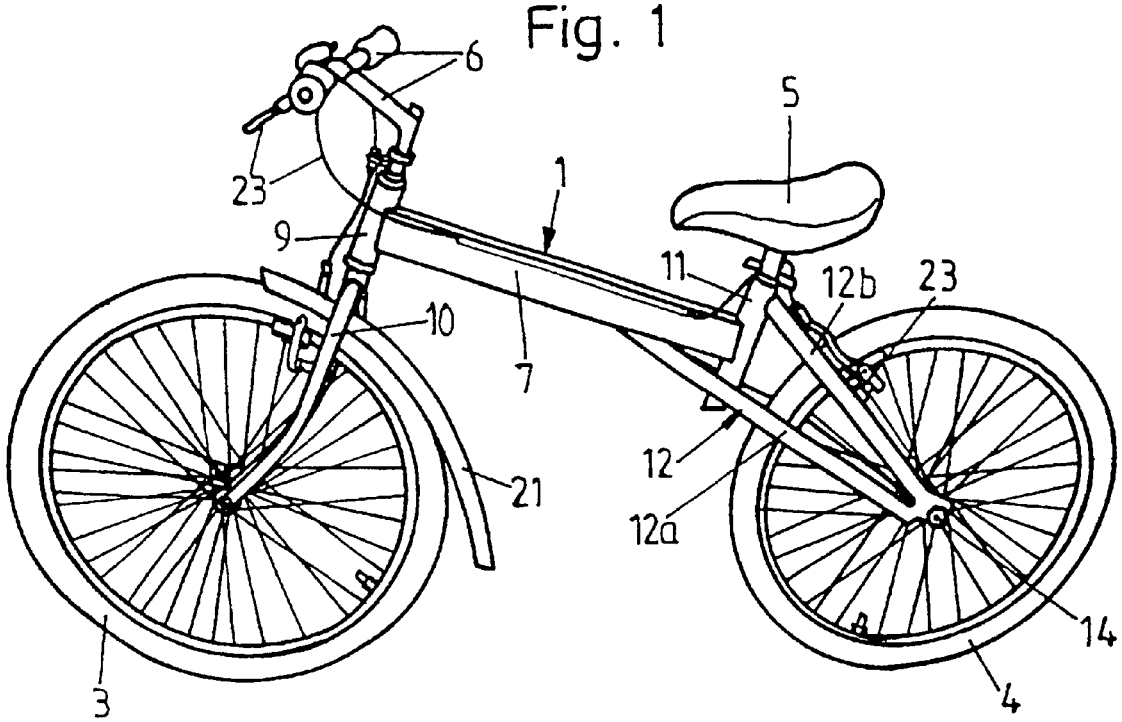
FIG. 1 a view in perspective of a coasting two-wheeler in the form of a dandy horse, with a frame whose tubes and stays are polygonal in cross-section, and an inclined upper longitudinal frame tube.

The two-wheeler is embodied as a coasting dandy horse, which the rider powers by pushing (walking) his feet on the pavement. This dandy horse has a frame (1, 2) with a front and a rear wheel (3, 4) that are rotatably seated in the frame; a saddle (5) that is supported by the frame (1, 2); and handlebars (6) for the front wheel (3).

The frame (1, 2) comprises an upper longitudinal frame tube (7, 8), a steering tube (9) with a front-wheel fork (10), a saddle-support tube (11) and a rear-wheel fork (12, 13) comprising metal and/or plastic, and/or a composite material.

Figure 2:
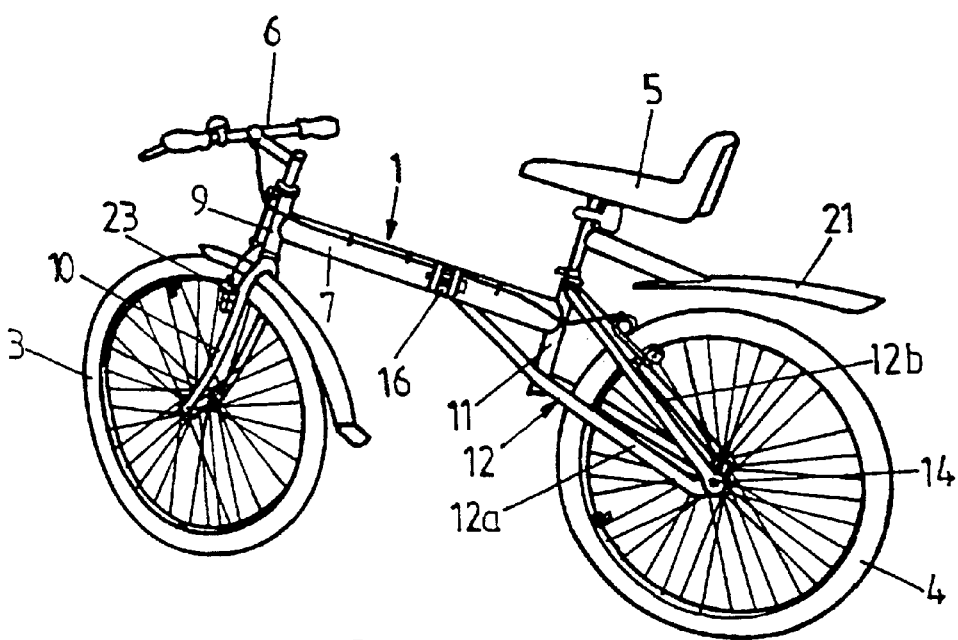
FIG. 2 a view in perspective of the collapsible dandy horse, with a hinge integrated into the upper longitudinal frame tube.
Figure 3:
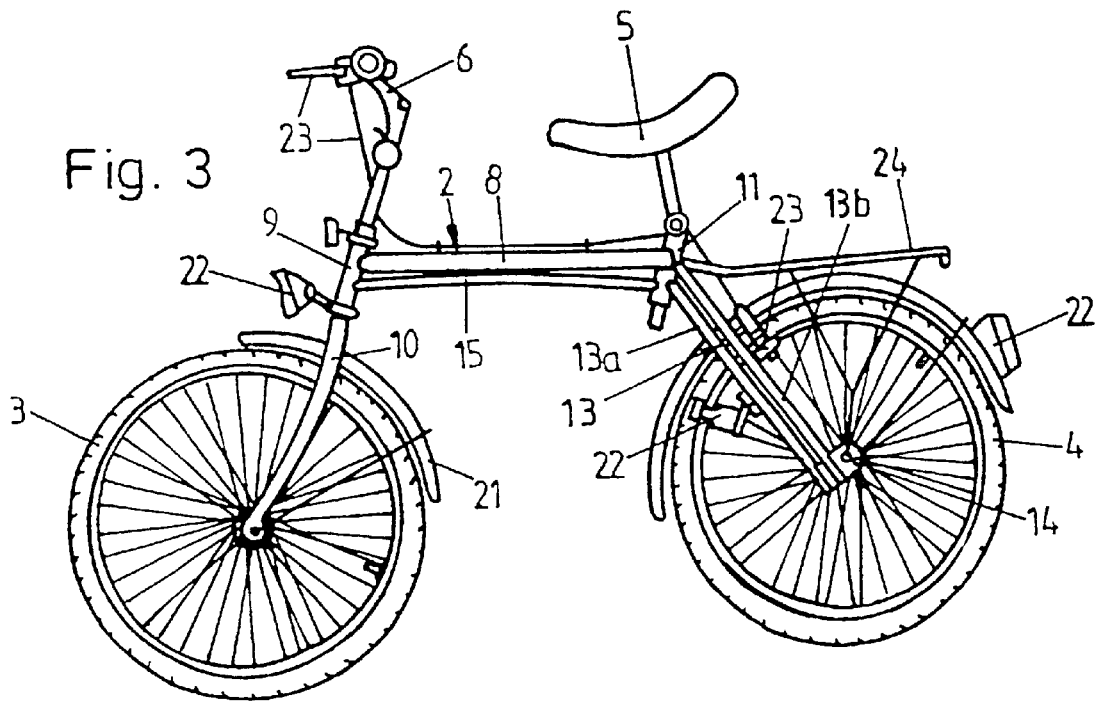
FIG. 3 a side view of the dandy horse, with a frame having double tubes and double stays and a horizontal upper longitudinal frame tube.
Figure 4:
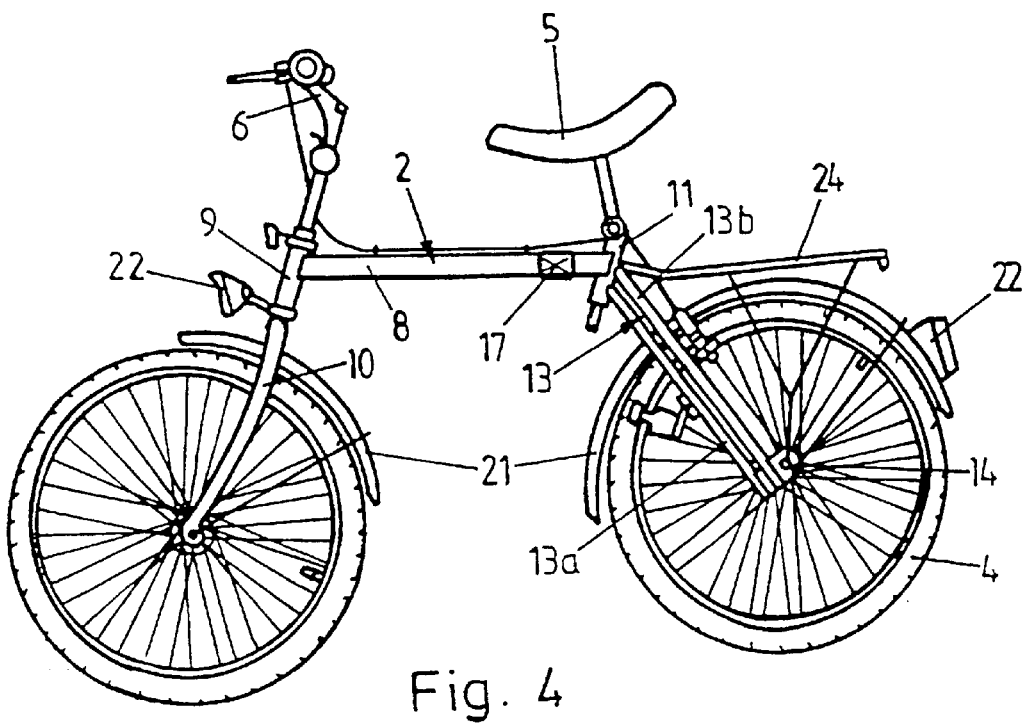
FIG. 4 a side view of the dandy horse, with a hinge or pin element in the upper longitudinal frame tube for collapsing or separating the dandy horse.

The longitudinal frame tube (8) according to FIGS. 3 and 4 extends horizontally between the steering and saddle-support tubes (9, 11), while the longitudinal frame tube (7) according to FIGS. 1 and 2 is inclined, and extends diagonally from the saddle-support tube (11) up to the steering tube (9).

The longitudinal frame tube (8) has a circular cross section, and the longitudinal frame tube (7) exhibits a polygonal, preferably square or rectangular, cross section, with the greater rectangular expansion extending in the height direction.

The inclined longitudinal frame tube (7) with the saddle-support tube (11) is supported with respect to the rear-wheel hub (14) by the rear-wheel fork (12), which has a round or polygonal cross section and is formed by two rear-wheel stays (12a, 12b) disposed on either side of the rear wheel (4) and diverging to extend diagonally upward; one stay (12b) extends from the rear-wheel hub (14) to the saddle-support tube (11), and the respective other stay (12a) extends from the rear-wheel hub (14) to the longitudinal frame tube (7), as shown in FIGS. 1 and 2.

The horizontally-extending longitudinal frame tube (8) with the saddle-support tube (11) is supported with respect to the rear-wheel hub (14) by two parallel rear-wheel fork stays (13a, 13b), which have a round or polygonal cross section, are disposed on either side of the rear wheel (4) and extend diagonally upward from the rear-wheel hub (14) to the saddle-support tube (11) (FIGS. 3 and 4).

The two different stays (12a, 12b/13a, 13b) of the rear-wheel forks (12, 13) can be used with the frame (2) having the horizontal longitudinal frame tube (8) and the frame (1) having the inclined longitudinal frame tube (7).

A stay (15) having a round or polygonal cross section is/can be associated with the longitudinal frame tube (7, 8). The stay extends between the saddle-support tube (11) and the steering tube (9), and at a distance below the longitudinal frame tube (7, 8), either parallel to the tube or in a curved shape. The cross section of the stay (15) is smaller than that of the longitudinal frame tube (FIG. 3).

In accordance with FIGS. 2 and 4, the dandy horse can be collapsible, in which case a locking hinge (16) is inserted into the longitudinal frame tube (7, 8).

The dandy horse can also be separated into two parts (detached), in which case the longitudinal frame tube (7, 8) is divided transversely to the longitudinal direction and has a locking pin connection (17).

Figure 6:
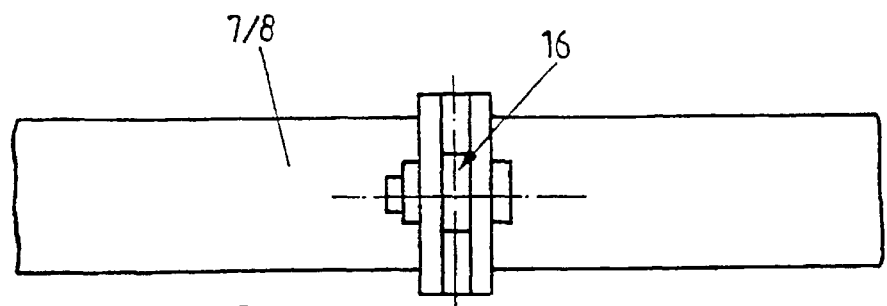
FIG. 6 a side view of a part of the longitudinal frame tube, with an integrated hinge.

The hinge (16) in FIG. 6 is embodied in a manner known for collapsible bicycles.

Figure 7:
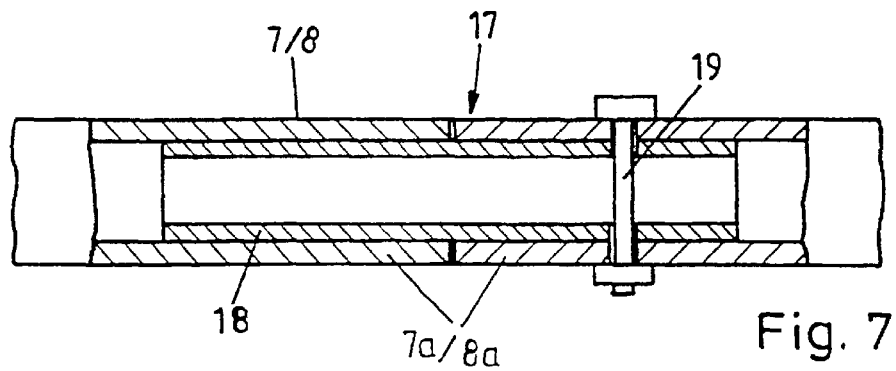
FIG. 7 a side view, partly in section, of a part of the longitudinal frame tube with a mounted pin connection.

The pin connection (17) according to FIG. 7 for the detachable dandy horse has a divided longitudinal frame tube (7, 8); a connecting tube or rod (18) is inserted into one tubular section (7a or 8a) of this longitudinal frame tube, and the other tubular section (8a) or (7a) is placed on the connecting tube (18) projecting out of the tubular section (7a) or (8a), and fixed in place by a securing element (19), such as a socket or stop pin or the like.

The pin connection (17) can also be produced through a reduction in the cross section of a tubular section (7a) or (8a), which is then inserted into the normal tubular section (8a) or (7a).

Figure 5:
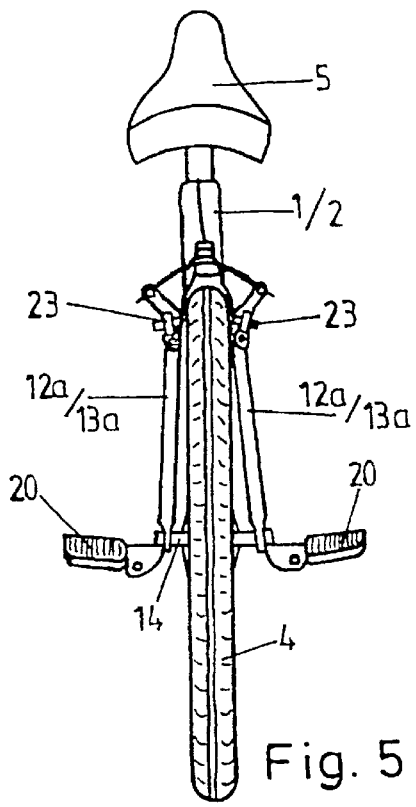
FIG. 5 a rear view of the dandy horse, with collapsible foot supports mounted to the rear-wheel hub.

In the rear-wheel hub (14), a collapsible foot support (20) can be positioned on either side of the rear wheel (4) (FIG. 5).

The frame (1, 2) can be spring-mounted with respect to the wheels (3, 4).

The dandy horse can be embodied with or without fenders (21) for the wheels (3, 4).

The dandy horse is further provided with a headlight and tail light (22), dynamo and safety brakes (23), hand grips, a Bowden cable and brake grips, a pack carrier (24), a kickstand (not shown), and a normal or banana saddle (5) with or without shock absorbers.

The wheels (3, 4) can have dual-chamber rims.

Normal bicycle steel, aluminum, plastic with fiberglass reinforcement (carbon/glass fiber/carbon) or other suitable materials can be used for the frame.

The size of the dandy horse varies; it can be produced in the standard 20-, 24-, 26- and 28-inch sizes.

What is claimed is:

1. A two-wheeler in the form of a dandy horse having no mechanical drive but permitting the rider to power the two-wheeler by pushing with his feet on a pavement, the two-wheeler comprising a frame with a front and a rear wheel that are rotatably seated in the frame; a saddle that is supported by the frame; and frame-supported handlebars for steering the front wheel, the frame (1, 2) having an upper longitudinal frame tube (7, 8), a steering tube (9) with a front-wheel fork (10), a saddle-support tube (11) and a rear-wheel fork (12, 13) wherein the longitudinal frame tube, (8) with the saddle-support tube (11) is supported with respect to the rear-wheel (14) by two parallel rear-wheel fork stays (13a, 13b) having a round or polygonal cross section, disposed on either side of the rear wheel (4) and extending diagonally upward from the rear-wheel (14) to the saddle-support tube (11), wherein a stay (15) having a round or polygonal cross section is associated with the longitudinal frame tube (8), the stay extending between the saddle-support tube (11) and the steering tube (9), and at a distance below the longitudinal frame tube (8), the stay (15) having a cross section that is smaller than that of the longitudinal frame tube.

2. The two-wheeler according to claim 1, wherein the stay (15) associated with the longitudinal frame tube (8) extends parallel to the tube or in a curved shape.

3. The two-wheeler according to claim 1, wherein the longitudinal frame tube (8) extends in a horizontal plane between the steering tube and the saddle-support tube (9, 11).

4. The two-wheeler according to claim 1, the longitudinal frame tube (7) is inclined, and extends diagonally from the saddle-support tube (11) up to the steering tube (9).

5. The two-wheeler according to claim 1, wherein the longitudinal frame tube (7, 8) has a circular cross section.

6. The two-wheeler according to claim 1, wherein the longitudinal frame tube (7, 8) has a rectangular cross section.

7. The two-wheeler according to claim 1, wherein the two-wheeler can be embodied as a collapsible bike, in which case a locking hinge (16) is inserted into the longitudinal frame tube (7, 8).

8. The two-wheeler according to claim 1, wherein the two-wheeler can be separated into two pieces, in which case the longitudinal frame tube (7, 8) is divided transversely to the longitudinal direction and has a locking pin connection (17).

9. The two-wheeler according to claim 1, wherein at the rear-wheel (14), a collapsible foot support (20) is secured to either side of the rear wheel (4).

10. The two-wheeler according to claim 1, wherein the frame (1, 2) is spring-mounted with respect to the wheels (3, 4).

11. The two-wheeler according to claim 1, wherein the two-wheeler is embodied with fenders (21) for the wheels (3, 4).

12. The two-wheeler according to claim 1, the two-wheeler has lights (22), safety brakes (23), a pack carrier (24) and a kickstand, and the wheels (3, 4) have dual-chamber rims.

13. The two-wheeler according to claim 1, wherein the two-wheeler is made from metal, plastic or a composite material.

* * * * *